(12) United States Patent
Partch et al.

(10) Patent No.: US 6,279,798 B1
(45) Date of Patent: Aug. 28, 2001

(54) STORAGE ASSEMBLY

(75) Inventors: Thomas William Partch, Trenton; Wayne Edward Bahr, Livonia, both of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/437,774

(22) Filed: Nov. 10, 1999

(51) Int. Cl.$^7$ ........................................................ B60R 7/00
(52) U.S. Cl. ........................................ 224/275; 297/188.2
(58) Field of Search ............................ 297/188.01, 188.2, 297/253, 188.21; 224/275, 400

(56) References Cited

U.S. PATENT DOCUMENTS

| | | |
|---|---|---|
| 4,512,503 * | 4/1985 | Gioso . |
| 4,756,573 | 7/1988 | Simin et al. . |
| 4,832,241 | 5/1989 | Radcliffe . |
| 4,938,401 | 7/1990 | Weisbrodt et al. . |
| 5,466,044 * | 11/1995 | Barley et al. . |
| 5,487,588 * | 1/1996 | Burleigh et al. . |
| 5,551,750 * | 9/1996 | Yoshimura . |
| 5,601,334 | 2/1997 | Marks . |
| 5,639,144 | 6/1997 | Naujokas . |
| 5,816,651 | 10/1998 | Feuerherdt . |
| 6,030,046 * | 2/2000 | Dorow . |
| 6,082,818 * | 7/2000 | Muller . |
| 6,082,819 * | 7/2000 | Jackson . |

FOREIGN PATENT DOCUMENTS 60-1035   1/1985   (JP) .

OTHER PUBLICATIONS

FMVSS; Child Restraint Systems; Child Restraint Achorage Systems; http://www.nhtsa.dot.gov/cars/rules/rulings/UCRA–OMB–J08/FinalRule.html, Oct. 18, 1999.

* cited by examiner

Primary Examiner—Milton Nelson, Jr.
(74) Attorney, Agent, or Firm—Ford Global Tech., Inc.

(57) ABSTRACT

A storage assembly 10 which is adapted for use within a vehicle of the type having conventional child safety seat anchors or brackets 12, 14, and a conventional vehicle seat 16 including a seat bottom or cushion portion 18 and a backrest portion 20. Assembly 10 includes a storage module 22, and two fastening members 24, 26 which are adapted to be respectively and removably coupled to brackets 12, 14.

15 Claims, 5 Drawing Sheets

STORAGE ASSEMBLY

FIELD OF THE INVENTION

This invention relates to a storage assembly and more particularly, to a storage assembly which may be removably attached to a pair of child safety seat brackets.

BACKGROUND OF THE INVENTION

Many automotive vehicles are or soon will be required to provide and include anchors or bracket type members for securing aftermarket child safety seats to conventional and/ or "factory provided" vehicle seats. These brackets are of a standard size, shape, and configuration; are mounted and/or are to be mounted/placed in standard predetermined locations upon the vehicle seats, and have a standard spacing arrangement; and are described for example and without limitation in Federal Motor Vehicle Safety Standard 225. More particularly, these brackets are or will be required to be rigidly mounted to the vehicle seat and/or to the vehicle body and to be accessible at and/or to protrude from the "juncture" of the seat backrest and the seat bottom.

While these brackets offer vehicle owners, operators, and providers of child safety seats a standardized arrangement and mechanism for rigidly placing and/or operatively attaching a child seat within a vehicle, they presently provide substantially no other utility.

Additional secure storage space is typically desired within the passenger compartment of a vehicle, although it cannot frequently and/or usually be provided due to the spatial constraints imposed by the various devices and assemblies which are utilized within and which cooperatively form the vehicle. For this reason, attempts have been made to provide storage assemblies which can be removably secured within the passenger compartment of a vehicle.

Such prior attempts include, for example and without limitation, storage containers or assemblies which are adapted to be secured to the vehicle's seats by use of a conventional seat belt, or by use of a member which is frictionally and removably secured and/or placed within and between the engaged or abutting seat back and the seat cushion. These prior containers suffer from some drawbacks. This is, since these containers do not fixedly and rigidly attach to the vehicle seat and/or body, but rather rely on a relatively "loose" or unstable seat belt or frictional attachments, they often became dislodged, tip, or overturn while the vehicle is being driven. More particularly, during relatively high vehicle accelerations/decelerations or during cornering, these prior assemblies/devices often undesirably "travel within" the passenger compartment.

Thus, it is desirable to provide a storage assembly which overcomes at least some of the drawbacks of prior storage assemblies and which may be used in combination with child safety seat brackets, thereby maximizing the utility of the brackets while concomitantly providing additional and substantially secure storage space within a vehicle passenger compartment.

SUMMARY OF THE INVENTION

It is an object of the present invention to provide a removable storage device and/or assembly within the passenger compartment of a vehicle which overcomes some or all of the previously delineated disadvantages of prior devices and/or assemblies.

It is a second object of the present invention to provide a storage assembly for use in combination with a vehicle having child safety seat brackets and which provides a relatively secure space or area for selectively and securely storing various items.

It is a third object of the present invention to provide a storage assembly which is adapted to be selectively and removably mounted to standard child safety seat brackets which are provided within a vehicle passenger compartment.

According to a first aspect of the present invention a storage assembly is provided. The storage assembly is adapted for use in combination with a vehicle of the type including a seat having a bottom portion which is joined with a backrest portion, and a pair of child safety seat brackets which are disposed between the bottom portion and the seat backrest. The storage assembly includes a storage compartment which rests upon the bottom portion, and a pair of latch members which are fixedly attached to and which project from the storage compartment. The latch members are selectively and removably attachable to the brackets, thereby removably securing the storage container to the brackets.

According to a second aspect of the present invention a method is provided for mounting a storage assembly within a vehicle of the type having a seat including a cushion, and first and second brackets disposed in relative close proximity to the cushion. The method includes the steps of providing a storage container having a first latch and a second latch; removably securing the first latch to the first bracket; and removably securing the second latch to the second bracket, thereby securing the storage container to the first and second brackets.

These and other features, aspects, and advantages of the invention will become apparent from a reading of the following detailed description of the preferred embodiment, by reference to the subjoined claims, and by reference to the following drawings.

DETAILED DESCRIPTION OF THE PREFERRED EMBODIMENT OF THE INVENTION

Figure 1:
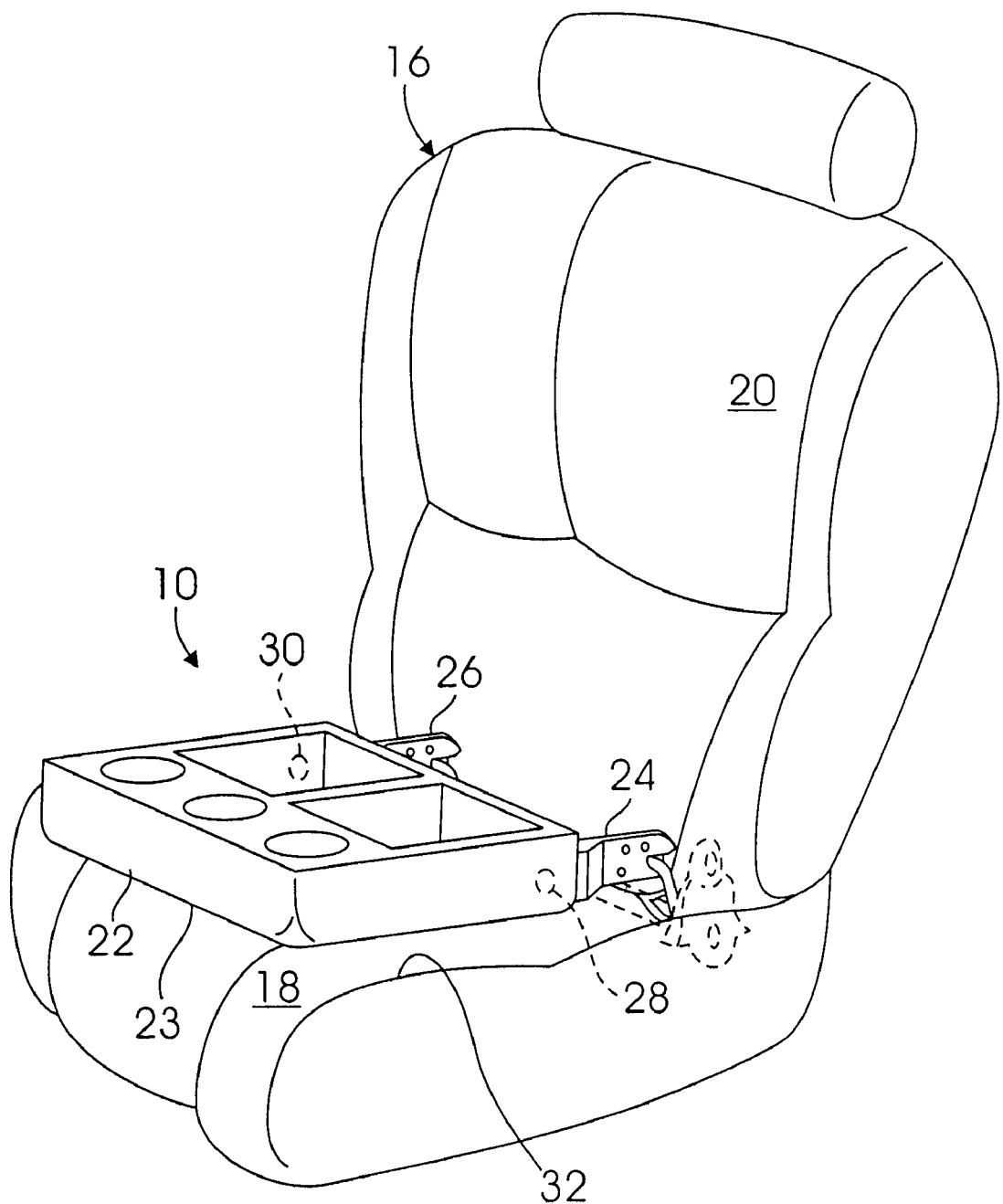
FIG. 1 is a perspective view of a storage assembly which is made in accordance with the teachings of the preferred embodiment of the invention, and which is operatively attached to conventional child safety seat brackets.
Figure 2:
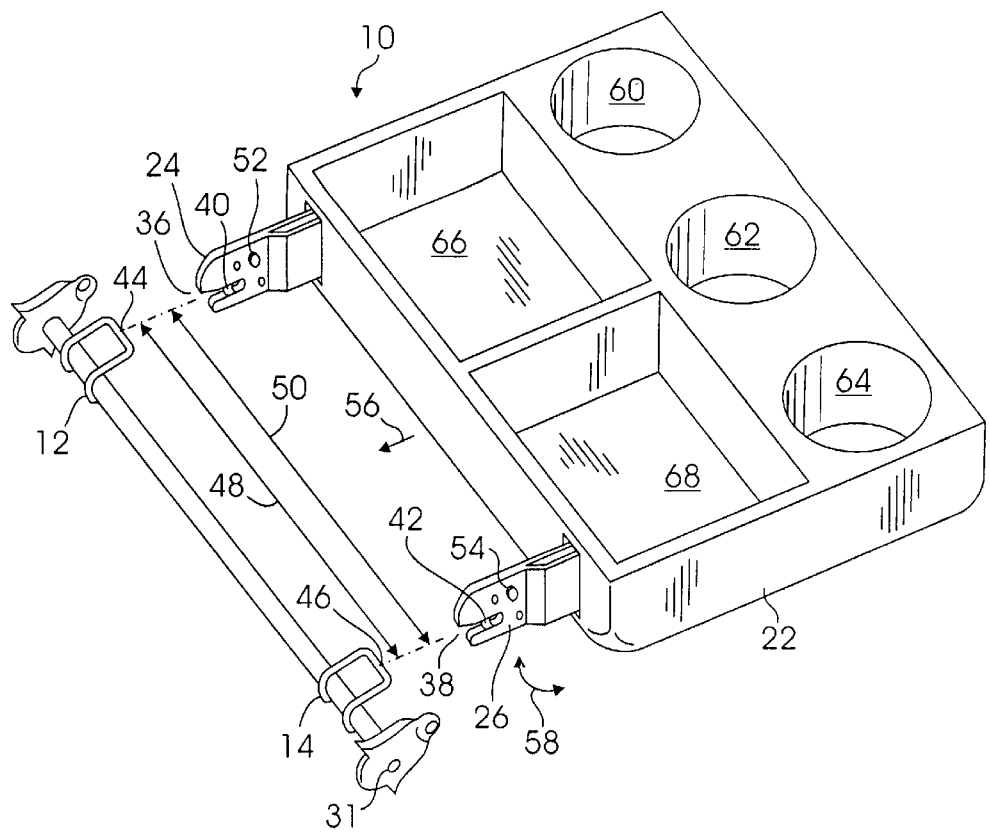
FIG. 2 is a perspective view of the storage assembly which is shown in FIG. 1 and which is removed from the child safety seat brackets.

Referring now to FIGS. 1–5, there is shown a storage assembly 10 which is made in accordance with the teachings of the preferred embodiment of the invention and which is adapted for use within a vehicle of the type having conventional child safety seat anchors, members, or brackets 12, 14, and a conventional vehicle seat 16 including a seat bottom or cushion portion 18 and a backrest portion 20. As shown, assembly 10 includes a storage container, receptacle, or module 22, and two fastening members or assemblies 24, 26 which are adapted to be respectively, selectively, and removably coupled to brackets 12, 14. Fastening assemblies 24, 26 are respectively, pivotally and conventionally attached to module 22 by conventional joint members 28, 30, such as pins, bolts, or screws.

Figure 4:
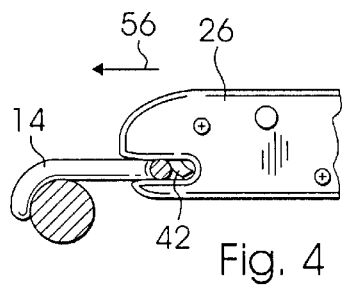
FIG. 4 is a partial view of the latch assembly which is employed within the storage assembly of FIG. 1 and which is in a partially latched state.
Figure 5:
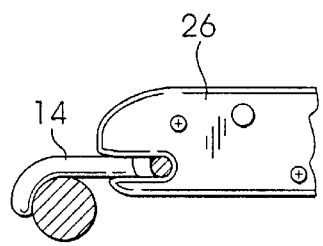
FIG. 5 is a partial view of the latch assembly which is employed within the storage assembly of FIG. 1 and which is in a "latched" state.
Figure 6:
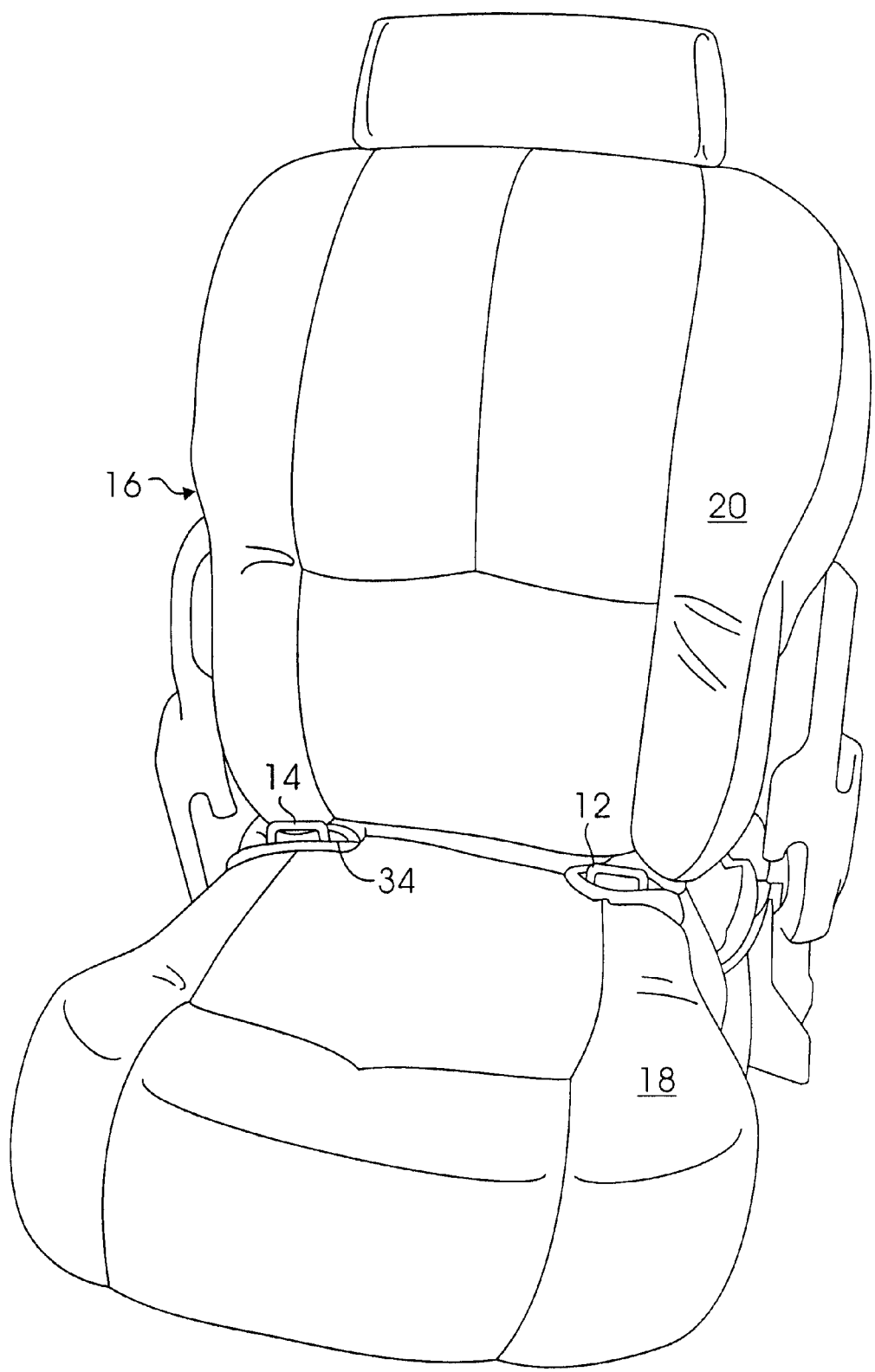
FIG. 6 is a partial view of a vehicle seat having conventional child safety seat brackets.
Figure 7:
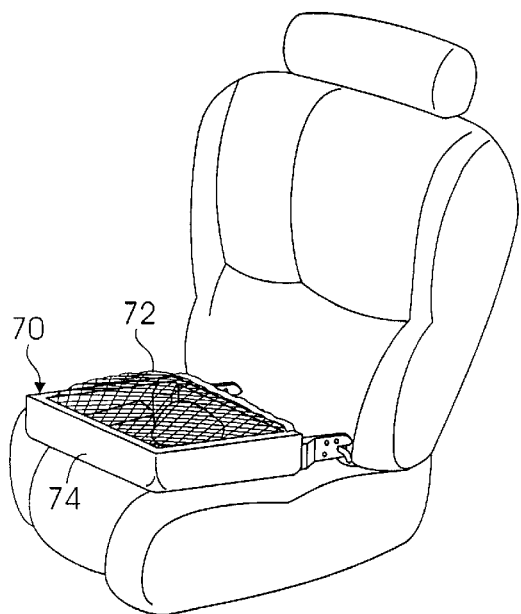
FIG. 7 is a perspective view of a storage assembly which is made in accordance with the teachings of a second embodiment of the invention.

The conventional child safety seat brackets 12, 14 illustrated in FIGS. 1–5 are fixedly coupled to and/or with the vehicle seat 18 which is rigidly attached to the body of the vehicle. Particularly, brackets 12, 14 are coupled to the crossbar 31 of seat 18 and are accessible at the juncture 34 of the seat bottom 18 and the seat backrest 20, as best shown in FIG. 6. The centers of symmetry 44, 46 of brackets 12, 14 are separated by a predetermined distance 48.

In the preferred embodiment of the invention, module 22 is manufactured from a relatively rigid and durable material such as metal, plastic, or a composite material. Module 22 includes a generally flat bottom portion 23 which abuttingly rests and/or resides upon the top surface 32 of seat cushion 18. In one non-limiting embodiment bottom portion 23 is shaped to conform to the top surface 32 of seat cushion 18. Module 22 preferably includes a plurality of storage compartments having various shapes and sizes, effective to accommodate, store, and/or contain a variety of objects and items. For example and without limitation, the non-limiting embodiment of module 22 illustrated in FIGS. 1 and 2 includes generally circular compartments 60, 62, and 64 in which items such as and without limitation beverage containers, change, or cans may be stored, and generally rectangular compartments 66 and 68 in which other items and/or objects may be stored.

Figure 8:
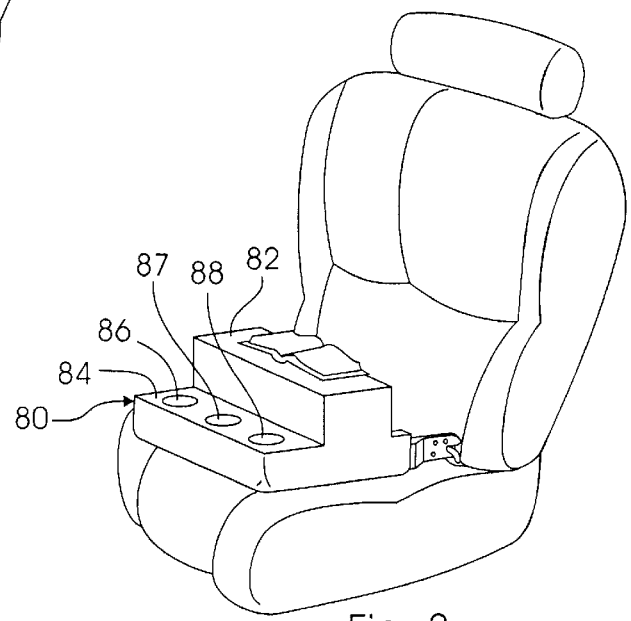
FIG. 8 is a perspective view of a storage assembly which is made in accordance with the teachings of a third embodiment of the invention.
Figure 9:
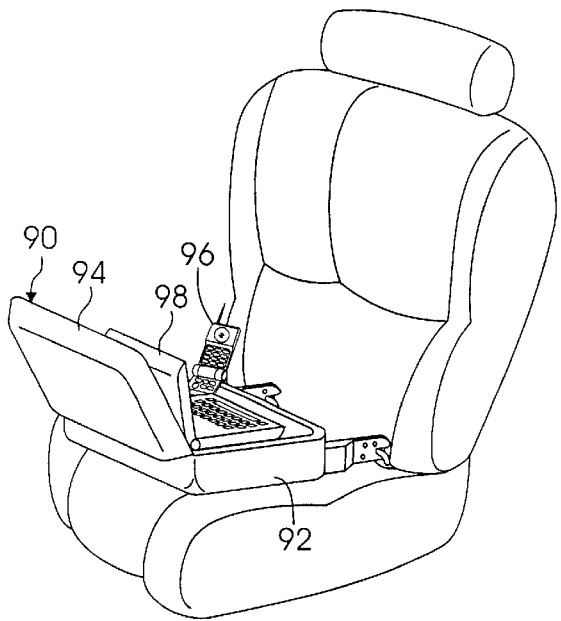
FIG. 9 is a perspective view of a storage assembly which is made in accordance with the teachings of a fourth embodiment of the invention.
Figure 10:
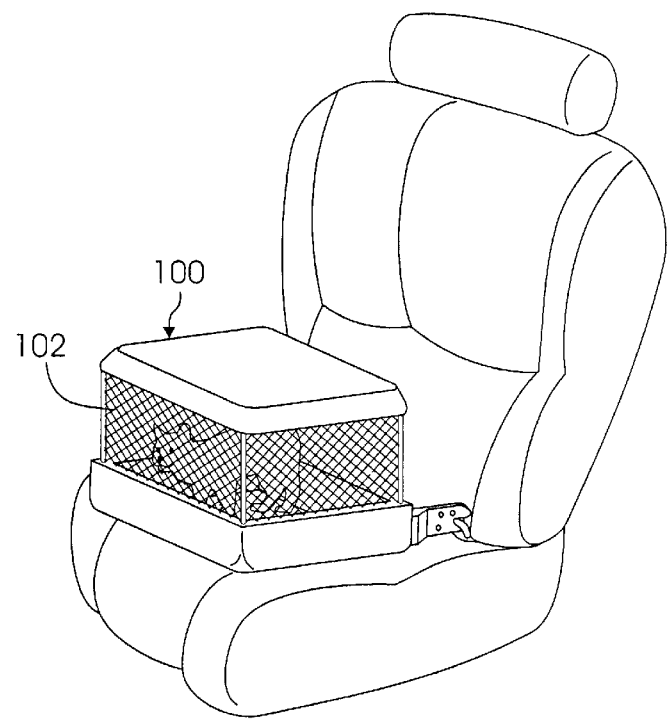
FIG. 10 is a perspective view of a storage assembly which is made in accordance with the teachings of a fifth embodiment of the invention.
Figure 11:
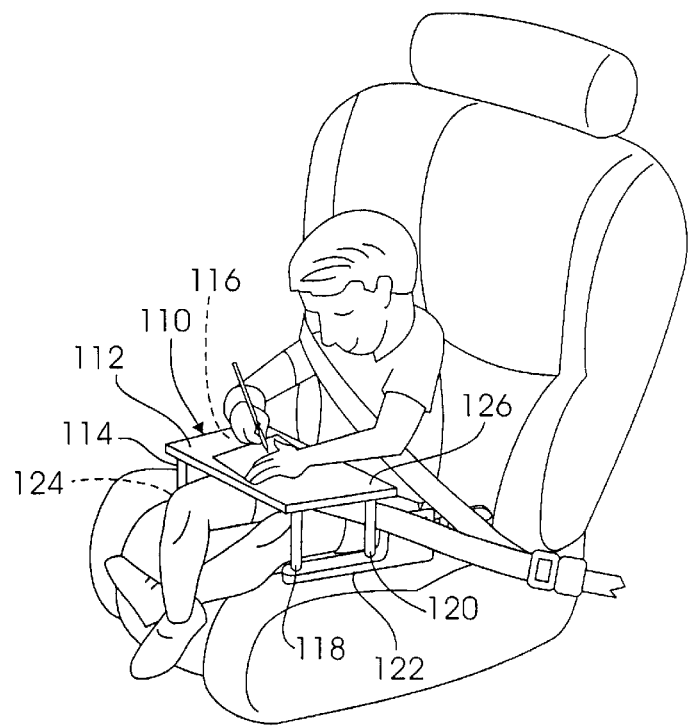
FIG. 11 is a perspective view of a storage assembly which is made in accordance with the teachings of a sixth embodiment of the invention.

Other alternate and non-limiting embodiments of module 22 are illustrated in FIGS. 7–11. Particularly, in FIG. 7 there is shown a module 70 made in accordance with the teachings of a second embodiment of the invention and including a flexible net or elastic member 72 which is attached to a generally rectangular housing 74 and which is adapted to securely store, hold, and/or maintain items within housing 74. FIG. 8 illustrates a module 80 made in accordance with the teachings of a third embodiment of the invention, which includes a generally rectangular raised portion or surface 82 on which a child may place items, such as a book, food, or toys, and a recessed portion or surface 84 which includes generally circular compartments 86, 87, and 88 in which items such as and without limitation beverage containers, change, or cans may be stored. FIG. 9 illustrates a module 90 made in accordance with the teachings of a fourth embodiment of the invention. Module 90 includes a generally rectangular storage compartment 92 and a lid member 94 which is conventionally and pivotally mounted to compartment 92. In one non-limiting embodiment, compartment 92 includes separate conventional compartments and/or devices which are designed, shaped, and/or sized to store "business" or office type items, such as cellular phone 96 and a laptop or portable computer 98. FIG. 100 illustrates a module 100 made in accordance with the teachings of a fifth embodiment of the invention and including a conventional cage 102 for transporting an animal or pet. FIG. 11 illustrates a module 110 made in accordance with the teachings of a sixth embodiment of the invention and including a raised tray portion 112 which is fixedly attached to four substantially identical elongated legs or support members 114, 116, 118, and 120, which cooperatively support portion 112 at a predetermined and desired height above surface 32 of seat cushion 18. Members 114–120 are attached to rail members 122 and 124, which rest upon surface 32 of seat cushion 18. As shown in FIG. 11, module 110 provides a raised surface 126 which a child may utilize (e.g., for eating, writing, or playing).

In the preferred embodiment of the invention, fastening assemblies 24, 26 comprise conventional latching mechanisms, and are attached in relative close proximity to the bottom 23 of module 22. Assemblies 24, 26 each respectively include substantially identical slots 36, 38 which are each respectively adapted to receive brackets 12, 14, and substantially identical and retractable latches 40, 42 which are respectively adapted to selectively secure brackets 12, 14 within slots 36, 38. In the preferred embodiment of the invention, assemblies 24, 26 are separated by a distance 50 which is substantially identical to distance 48, thereby allowing assemblies 24, 26 to be substantially aligned and engaged with the centers of symmetry 44, 46 of brackets 12, 14. In the preferred embodiment of the invention, assemblies 24, 26 further include conventional latch release buttons, levers, or members 52, 54. In other alternate embodiments, members 24, 26 may comprise any type of conventional fasteners such as and without limitation, straps, clamps, hooks, elastic attachments, or any other type of member adapted to be securely and removably coupled to brackets 12, 14.

Figure 3:
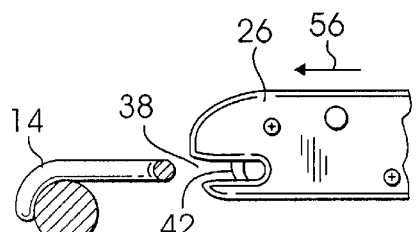
FIG. 3 is a partial view of the latch assembly which is employed within the storage assembly of FIG. 1 and which is in an "unlatched" state.

In order to efficiently utilize the available child seat brackets 12, 14, according to the teachings of the preferred embodiment of the invention, assembly 10 is adapted to be selectively and removably placed onto seat cushion 18 and attached to brackets 12, 14. Particularly, in operation, fastening assemblies 24, 26 are respectively aligned with brackets 12, 14. As best shown in FIGS. 3–5, assemblies 10, 24 and 26 are cooperatively and collectively moved in the direction of arrow 56, thereby allowing slots 36, 38 to respectively receive brackets 12, 14. As assemblies 24, 26 are forced in the direction of arrow 56, brackets 12, 14 engage latches 40, 42, thereby causing latches 40, 42 to retract as best shown in FIG. 4. Once brackets 12, 14 reach the end of slots 36, 38, latches 40, 42 return to their original position thereby securing brackets 12, 14 within assemblies 24, 26.

Once assemblies 24, 26 have been connected to brackets 12, 14, module 22 is rested on seat bottom 18. Joints 28, 30 allow assemblies 24, 26 to pivot in the direction of arrows 58, thereby allowing module 22 to rest in a substantially horizontal position upon seat bottom 18. Assembly 10 can be removed from brackets 12, 14 by depressing latch release levers 52, 54. In this manner, it should be appreciated that assembly 10 provides additional utility for conventional child safety seat brackets and additional secure storage space within a vehicle. Furthermore, assembly 10 provides additional storage space within the passenger compartment of a vehicle which is fixedly secured to members (e.g. brackets 12, 14) which are rigidly attached to the vehicle seat and/or the vehicle body. Moreover, assembly 10 allows a user to choose from several secure locations within the vehicle (e.g. each seat having child safety brackets) at which assembly 10 may be fixedly and rigidly secured.

It is to be understood that the invention is not limited to the exact construction and method which has been illustrated and described above but that various changes and modifications may be made without departing from the spirit and the scope of the invention.

What is claimed is:

1. A storage assembly for use in combination with a vehicle including a seat having a bottom portion which is joined to a backrest portion and a pair of child safety seat brackets which are disposed between said joined bottom portion and said backrest portion, said storage assembly comprising:

a storage module which is adapted to be rested upon said bottom portion of said seat, and which includes a plurality of storage compartments in which certain items may be selectively stored; and a pair of fastening members which are attached to said storage module, which each includes a latch, and which are positioned to allow said members to be selectively and removably attachable to said brackets, thereby allowing said storage module to be selectively secured to said brackets.

2. The storage assembly of claim 1 wherein said plurality of compartments includes at least one rectangular storage compartment and at least one circular storage compartment.

3. The storage assembly of claim 1 wherein said storage module is made from plastic.

4. The storage assembly of claim 1 wherein said storage module comprises a generally rectangular housing in which certain items may be stored and a flexible net which is attached to said housing and which is effective to secure said certain items within said housing.

5. The storage assembly of claim 1 wherein each of said fastening members comprises a release lever for removing said fastening members from said brackets.

6. The storage assembly of claim 1 wherein said fastening members are attached to said storage module by way of a pair of joints which allow said fastening members to pivot with respect to said storage module.

7. An assembly for use within a vehicle having a seat including a seat cushion and a pair of members which are rigidly attached to said seat, said assembly comprising:

a module having a bottom portion which selectively resides upon said seat cushion and a top portion including a plurality of storage compartments in which certain items may be stored; and a pair of fasteners which are coupled to said bottom portion, which each includes a latch assembly, and which are selectively and removably attachable to said members, thereby allowing said module to be removably secured to said members.

8. The assembly of claim 7 wherein said bottom portion is shaped to conform to said seat cushion.

9. The assembly of claim 7 wherein said plurality of storage compartments includes a plurality of generally circular compartments and a plurality of generally rectangular compartments.

10. The assembly of claim 7 wherein said fasteners are pivotally coupled to said module, thereby allowing said module to reside upon said seat cushion in a substantially horizontal position.

11. A method for mounting a storage assembly within a vehicle having a seat including a cushion, and first and second brackets disposed in relative proximity to said cushion, said method comprising the steps of:

providing a storage container having a bottom portion a plurality of storage compartments in which certain items may be stored, and a first and second fastener coupled to said storage container in relative close proximity to said bottom portion;

removably coupling said first fastening member to said first bracket; and removably coupling said second fastening member to said second bracket, thereby removably securing said storage container to said first and said second bracket.

12. The method of claim 11 wherein said first and said second fastening member each comprises a latch.

13. The method of claim 12 wherein said storage container is made from plastic.

14. The method of claim 12 wherein said first and said second fastening members are each pivotally attached to said storage container.

15. The method of claim 12 wherein said first and said second fastening member each comprises a strap.

* * * * *